(12) United States Patent
Lewin et al.

(10) Patent No.: US 6,770,706 B2
(45) Date of Patent: Aug. 3, 2004

(54) ASSEMBLY ADHESIVE BASED ON AN AQUEOUS (CO)POLYMER DISPERSION

(75) Inventors: Anke Lewin, Duesseldorf (DE); Wolfgang Klauck, Duesseldorf (DE); Gaby Schilling, Duesseldorf (DE); Martin Majolo, Erkelenz (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/240,459

(22) PCT Filed: Mar. 30, 2001

(86) PCT No.: PCT/EP01/03627
§ 371 (c)(1),
(2), (4) Date: Oct. 1, 2002

(87) PCT Pub. No.: WO01/74961
PCT Pub. Date: Oct. 11, 2001

(65) Prior Publication Data
US 2003/0144405 A1 Jul. 31, 2003

(30) Foreign Application Priority Data
Apr. 4, 2000 (DE) .......................................... 100 16 673

(51) Int. Cl.$^7$ ............................................. C08F 212/08
(52) U.S. Cl. ....................... 524/577; 524/515; 524/522; 524/555; 524/556; 524/560; 524/425; 524/492
(58) Field of Search ................................. 524/577, 515, 524/522, 555, 556, 560, 425, 81, 492, 533; 523/334

(56) References Cited

U.S. PATENT DOCUMENTS 4,661,548 A 4/1987 Parker ........................ 524/204
6,286,718 B1 * 9/2001 Durrant ........................ 222/80
6,451,899 B1 * 9/2002 Zhao et al. .................. 524/501
6,485,601 B1 * 11/2002 Egan et al. .............. 156/331.8

FOREIGN PATENT DOCUMENTS

| CA | 2229216 | 2/1997 | |
|---|---|---|---|
| GB | 2 061 990 | 5/1981 | |
| GB | 2061990 A * | 5/1981 | .............. C09J/3/14 |
| WO | WO 97/07173 | 2/1997 | |

OTHER PUBLICATIONS

Plastics–Polymer dispersions–Determination of non-volatile matter (residue) at specified temperatures (ISO 1625), International Organization for Standards, Switzerland, $2^{nd}$ Edition (Feb. 15, 1998).

Building construction–Jointing products– Determination of extrudability of sealants using standardized appartus (ISO 9048), International Organization for Standardiztion, $1^{st}$ Edition (Dec. 1, 1987).

* cited by examiner

Primary Examiner—David W. Wu
Assistant Examiner—Satya Sastri
(74) Attorney, Agent, or Firm—Stephen D. Harper; Glenn E. J. Murphy

(57) ABSTRACT

An aqueous polymer adhesive is provided containing styrene polymers or styrene copolymers with alkyl acrylate acid/or alkyl methacrylates and a thickener system containing an inorganic thickener and an aqueous dispersion of an acrylic acid/acrylamide copolymer which can be partially replaced by a dispersion of a (co)polymer containing acrylate residues, a dispersion of a (co)polymer containing acrylic acid residues and methacrylic acid residues and polyarethanes. The adhesive has a high initial strength and can be in layers up to 30 mm thick.

17 Claims, No Drawings

ASSEMBLY ADHESIVE BASED ON AN AQUEOUS (CO)POLYMER DISPERSION

RELATED APPLICATIONS

This application is a 35 U.S.C. 371(c) application of PCT/EP01/03627 filed Mar. 30, 2001 which claims priority form German Application DE 100 16 673.3 filed Apr. 4, 2000, the entire contents of each application are incorporated herein by reference.

FIELD OF THE INVENTION

This invention relates to an adhesive based on an aqueous polymer dispersion containing added thickeners and optionally fillers, pigments, preservatives, solvents, plasticizers and other auxiliaries. The invention also relates to its production and to its use as an assembly adhesive.

BACKGROUND OF THE INVENTION

An assembly adhesive is understood to be a composition which, on the strength of the following properties, is suitable for assembly purposes above all in the building industry:

very high early strength and ultimate strength in the bonding of wood, metals, ceramics, PVC and other plastics both indoors and outdoors and particular abilities in regard to gap bridging, adhesion spectrum and flexibility.

A preferred application for assembly adhesives is the rapid and permanent fixing of objects to ceilings, walls and floors. A particular requirement in this regard is the rapid and simple assembly of heavy objects without any need for additional fixing after application of the adhesive (for example in the bonding of bricks, clinker bricks, panels, ceiling boards, etc.). The adhesive composition also has to be capable of "bridging" any surface unevenness (gap bridging).

The assembly adhesives hitherto available on the market have a maximum early strength of 10 $g/cm^{-2}$ so that, although light objects can be assembled without any need for additional fixing, problems do arise in the case of heavy objects, such as ceiling panels for example. Further problems arise in the assembly of items which are under tension (for example curved skirting boards). Items such as these have to be additionally fixed until the adhesive has cured. Assembly applications such as these always involve time-consuming and, in some cases, complicated extra work.

There are four types of assembly adhesives:
a) solvent-containing systems,
b) reactive systems,
c) hotmelt adhesives,
d) water-based systems.

Solvent-containing assembly adhesives are unpopular, particularly for indoor work involving large surface areas, because troublesome odor emission is often caused by solvent vapours. The advantage of using solvent-containing systems is that the solvent present is able to escape quickly from the adhesive composition so that high early strength can be obtained relatively quickly for assembly jobs.

Reactive systems and hotmelts either require special conditions/equipment for application or take a relatively long time to develop adequate adhesion properties for assembly work.

Water-based systems have the disadvantage that the water present is released very slowly. Accordingly, the curing process of the adhesive is relatively slow. The major advantage of water-based systems is that there is no odor emission and/or health risk from solvent vapours. However, there have hitherto been no assembly adhesives with adhesion values in excess of 10 and more particularly in excess of 15 $g/cm^{-2}$.

Where acrylate dispersions are heavily thickened with relatively high concentrations of acrylate thickeners to achieve high early strength (particularly via their viscosity), it has hitherto only been possible to obtain very high-viscosity adhesive compositions that are difficult to apply, are not stable in storage and show poor wetting behavior on the substrates to be bonded.

GB 2 061 990 describes an adhesive for fixing ceramic tiles. It contains 2 to 50% by weight of an aqueous dispersion or solution of an organic polymer with a solids content of 30 to 70%, 4 to 80% by weight of an inorganic filler, 0.5 to 15% by weight of an organic additives and 0 to 10% by weight of auxiliaries.

In the Examples, adhesives are made up from the following components:

100 parts by weight of a styrene/acrylate copolymer in the form of a dispersion with a solids content of 45%, 450 parts by weight of sand with various particle sizes, 5 parts by weight of a coalescence solvent based on an aromatic glycol ether, 1 to 2 parts by weight of cellulose ether with a viscosity of 15,000 as thickener, 2 to 1 part by weight of Aerosil and 50 to 55 parts by weight of water.

Besides cellulose ethers, polyacrylates are mentioned as organic thickeners. The adhesive in question is said to be used for fixing ceramic tiles to floors. Apparently, however, ceramic tiles can even be fixed to walls. The disadvantage of this known adhesive is that its early strength is not high enough for fixing heavy items, such as tiles for example, to walls immediately after levelling of the adhesive.

The problem addressed by the present invention was to provide a storable adhesive with very high early strength for fixing heavy items. The adhesive would be easy to use. This would apply in particular to its application to and spreading over the substrate.

BRIEF DESCRIPTION OF THE INVENTION

The solution provided by the invention is defined in the claims and consists primarily in a composition that can be produced from the following components:

A) 10 to 98, more particularly 51 to 88 and above all 60 to 70% by weight of at least one dispersion of a copolymer of at least styrene and an alkyl acrylate or alkyl methacrylate containing 1 to 12 and more particularly 2 to 8 carbon atoms in the alkyl group, the solids content of the dispersion being in the range from 30 to 80% by weight and more particularly in the range from 40 to 65% by weight, B) a thickener of a combination of
  a) 0.4 to 6, more particularly 0.5 to 5 and above all 1 to 3% by weight of an inorganic thickener, such as highly disperse silica, and
  b) 1 to 10 and more particularly 1.5 to 5% by weight of an aqueous system of a copolymer based on at least acrylic acid and acrylamide with a solids content of 10 to 40 and more particularly 25 to 35% by weight, up to 90% by weight and more particularly up to 50% by weight of this aqueous system being replaceable by at least one of the following aqueous polymer dispersions containing polymers based on acrylates, copolymers based on acrylic acid and methacrylic acid and water-soluble polyurethanes with a solids content of 20 to 40 and more particularly 25 to 35% by weight, C) 0 to 88 and more particularly 20 to 35% by weight of inorganic or organic fillers, more particularly chalk, limestone powder, sand, marble powder or titanium dioxide, D) 0 to 2% by weight of inorganic or organic pigments, more particularly iron oxides, E) 0 to 3 and more particularly 0 to 1% by weight of auxiliaries, more particularly dispersion aids, such as Pignmentverteiler A ("Pigment Dispersant A") and preservatives, F) 0 to 40 and more particularly 0 to 10% by weight of plasticizers and G) water.

DETAILED DESCRIPTION OF THE INVENTION

The percentage by weight of styrene in the styrene/methacrylate or styrene/acrylate copolymers should be in the range from 30 to 100% by weight and more particularly in the range from 50 to 100% by weight. The styrene comonomer may be substituted, for example by a methyl substituent. The alkyl group of the acrylate may be linear, branched or cyclic and optionally substituted. Examples are methyl, ethyl, isopropyl, butyl, dodecyl, cyclohexyl, 2-ethylhexyl and 2-hydroxyethyl. The acrylates may also contain reactive groups for subsequent crosslinking. Corresponding reactive groups may also contain vinyl comonomers, for example a silane group. The $Si(Alk)_3$ group may be attached to the vinyl group either directly or by a $(CH_2)_n$ radical where n may be a number of 2 to 6 and preferably has a value of 3 or 0. The alkyl groups may contain 1 to 4 carbon atoms and preferably 1 or 2 carbon atoms. Other comonomers can be vinyl esters, maleic acid esters (again containing 1 to 12 and preferably 2 to 8 carbon atoms in the alcohol component), ethylene, acrylamide, acrylic acid, butadiene, acrylonitrile both individually and in the form of mixtures. The molecular weight is above 100,000 g/mole. Commercially available styrene copolymers are: Acronal 290 D, Scopacryl D 343, Ubatol VAF 1539, Acronal S 360 D, Scopacryl PAA D 8875, Acronal S 400, Acronal S 401, Styrofan A 900, Rhodopas DS 913, Joncryl 678, Vinnapas LL 6010 and SAF 54, Neocryl A 621 (styrene/acrylate copolymer), Pliotec LS 1 (styrene/butyl acrylate/methacrylic acid terpolymer), Mowilith DM 611, Mowilith DM 680, Styropor P 555 (pure styrene), Buna EM 2116, Styrolux 684 D, Rhodopas SB 012, (styrene/butadiene copolymer), Novodur P2M, Synthomer VL 10286 (styrene/butadiene/acrylonitrile terpolymer). DL 345 from Union Carbide, Rhodapas DS 910 from Rhone Poulenc, Revacryl 248 from Harco/Clariant and Primal P 308 M from Rohm and Haas are particularly preferred. Mixtures of various styrene/acrylate copolymer dispersions may also be used.

The styrene copolymers may be produced by known methods, more particularly by emulsion or bead polymerization. These processes give aqueous dispersions with a concentration of around 40 to 70% by weight of styrene copolymer. However, the styrene copolymers may also be produced in bulk or solution.

The thickeners are generally high molecular weight substances which either absorb water and swell in the process or form intermolecular lattice structures. The organic thickeners ultimately change into a viscous, true or colloidal solution.

The organic thickener contains an aqueous system of a copolymer based on at least acrylic acid and acrylamide, preferably emulsified in an oil fraction, more particularly a petroleum fraction. However, it may also quite generally be an aqueous dispersion of the copolymer or an aqueous solution. The solids content of the system is in the range from 10 to 40% and more particularly in the range from 25 to 35%, as measured to DIN 53189 or ISO 1625. Its pH value as measured DIN ISO 976 is above all in the range from 7.5 to 9. Actual examples of the w/o emulsion are Collacral HP (BASF) and Texipol types (Scott-Bader).

The organic thickeners used as auxiliaries are aqueous dispersions or solutions which may replace up to 90% by weight and more particularly up to 50% by weight of the aqueous system of the copolymer based on at least acrylic acid and acrylamide, preferably the w/o emulsion. Actual examples are the water-soluble polyurethane thickener Nopco DSX 3290 (Cognis), the aqueous solution of the terpolymer of acrylates and methacrylates and carboxyfunctional comonomers Indunal T 112 (Indulor Chemie) which is an associative anionic thickener, the acrylate polymer dispersion Acrysol TT 615 (Rohm & Haas) which is an alkali-swellable anionic dispersion with a solids content of ca. 30% by weight, polymer dispersion based on acrylic acid and acrylamide.

The function of the fillers is to reduce shrinkage and to influence consistency. Actual examples are in particular the Omyacarb chalks (Oyma).

Other suitable inorganic filler particles are, for example, filler particles of andalusite, sillimanite, kyanite, mullite, pyrophyllite, imogolite and allophane. Compounds based on sodium aluminates or calcium silicates are also suitable, as are compounds based on sodium aluminates or calcium silicates. Also suitable are minerals, such as silica, calcium sulfate (gypsum) which does not come from waste-gas desulfurization plants in the form of anhydrite, semihydrate or dihydrate, silica flour, silica gel, barium sulfate, titanium dioxide, zeolites, leucite, potash feldspar, biotite, the group of soro-, cyclo-, ino-, phyllo- and tectosilicates, the group of poorly soluble sulfates, such as gypsum, anhydrite or heavy spar, and calcium minerals, such as calcite or chalk ($CaCO_3$). The inorganic materials mentioned may be used individually. However, a mixture of two or more of the compounds mentioned may equally well be used.

The filler particles have an x50 value for the mean particle size distribution in the range from about 1 to about 120 $\mu$m, for example in the range from about 3 to about 60 $\mu$m or in the range from about 60 to about 90 $\mu$m, as measured with a Sympatec Helos H 0720 in isopropanol.

Organic filler particles which cannot readily be assigned to the water-soluble or water-dispersible polymers are also suitable. These include in particular the finely ground plastic powders obtained in the recycling of plastics, more particularly the plastic powders obtainable from the fine grinding of highly crosslinked elastomeric or thermoset polymers. One example of such powders is the rubber powder obtained, for example, in the fine grinding of car tires.

The function of the pigments is to color the assembly adhesive. Organic pigments and iron oxides are preferred. Actual examples are the Bayferrox types (Bayer).

Fatty compounds above all are used as plasticizers in a quantity of 0 to 60% by weight, preferably in a quantity of 1 to 50% by weight and more particularly in a quantity of 10 to 40% by weight, based on the polystyrene. Quantities of 0 to 40% by weight and more particularly 0 to 10% by weight, based on the assembly adhesive, may also be used. Fatty compounds in the context of the invention are understood to be fatty acids, fatty alcohols or derivatives thereof, more particularly triglycerides of higher fatty acids and preferably natural fats and oils. Full particulars can be found in WO 97/07173.

The auxiliaries include:

Preservatives for avoiding fungal and bacterial infestation. Actual preservatives are JMAC-LP, 1%, a product of Johnson & Matthey, and Mergal KM 3, a product of Troy Chemie GmbH.

Solvents for influencing open time and mechanical properties. An actual example is butyl glycol.

Dispersion aids for improving the wetting behavior of the adhesives. An actual example is Pigmentverteiler A ("Pigment Dispersant A") (BASF).

A coalescing agent is not normally necessary.

Solvents do not have to be added either.

The balance to 100% by weight is water.

The pH value of the assembly adhesive is generally above 7 and preferably in the range from 7 to 10. In this pH range, the thickening effect of the thickeners used is at its most favorable. At pH values above 10, the acrylate thickeners used decompose and undergo a serious deterioration in their thickening effect. At pH values below 7, there is also a marked deterioration in the thickening effect of the thickeners used.

The high early strength of the assembly adhesive used is largely attributable to its particular rheology. In the so-called rest state, the assembly adhesive is dimensionally stable. During mechanical processing, however, there is a reduction in viscosity so that the adhesive can readily be stirred and processed. Shearing causes a reduction in viscosity so that, for example, the adhesive can readily be expressed from a cartridge. When the shear forces are removed from the adhesive, it returns to its original viscosity. There is hardly any evidence of a delayed increase in viscosity.

The assembly adhesive according to the invention is generally prepared as follows: all the components except the aqueous system of the acrylic acid/acrylamide copolymer are stirred for ca. 30 minutes at room temperature (ca. 20° C.) with a planetary stirrer comprising a dissolver disk at a stirring speed of 50 r.p.m. and a dissolver speed of ca. 1,000 r.p.m. to form an optically homogeneous composition. The aqueous system of the acrylic acid/acrylamide polymer is then added and stirring is continued for another ca. 10 mins. Finally, a vacuum of ca. 10 mbar is preferably applied for 5 mins. followed by venting. A creamy, spreadable, dimensionally stable composition is thus obtained by adding component Bb) to the mixture of the other components.

Anyone can use the adhesive without any need for special equipment such as, for example, hotmelt guns, UV lamps, or for complicated work such as, for example, mixing components in certain ratios, applying primers, etc., as is the case with known assembly adhesives.

The assembly adhesive according to the invention is packed in cartridges from which it can readily be expressed with a commercially available gun. However, it may also be packed in buckets, tubes and pressurized containers to TRG 300.

Accordingly, the present invention also relates to an adhesive thus packaged, more particularly an adhesive in a cartridge.

By virtue of its creamy consistency, the adhesive levels easily after application. It may be used for bonding, coating, sealing and filling and, more particularly, for the bonding of constructions of wood, ceramic, glass, cement, metal and plastics.

The adhesive according to the invention may be applied in layer thicknesses of up to 30 mm and more particularly 1 to 20 mm.

The adhesive formulations according to the invention are distinguished by the following features and are thus clearly distinguished from the performance spectrum of other assembly adhesives based on aqueous dispersions, more particularly from the adhesive according to GB 2 061 990:

1. The early strengths achieved with the described formulations are far above the adhesion values hitherto known for dispersion-based assembly adhesives. Tests on assembly adhesives based on polymer dispersions produced maximum early adhesion strengths of 10 $g/cm^{-2}$. By contrast, the formulations described above develop early adhesion values of more than 10 and more particularly $\geq 15$ $g/cm^{-2}$ or even $\geq 20$ $g/cm^{-2}$.

2. The adhesive formulations described above show very pronounced pseudoplastic behavior so that they are easy to process and easy to handle. The extrusion rate as determined to ISO 9048 can vary within wide limits according to the composition and is generally between 1,000 and 7,000 and more particularly between 2,000 and 5,000 g/min at 23° C. for a nozzle diameter of 4 mm. Despite their very high viscosity, the formulations show good wetting behavior and, for example, can be expressed from a cartridge with a normal cartridge gun. Nevertheless, not only are they dimensionally stable almost immediately, they are also capable of fixing even heavy objects without any aids.

3. Since the adhesive according to the invention is a dispersion-based adhesive, no organic solvent vapors are emitted during drying of the adhesive so that drying is substantially odorless. In addition, there is no health risk from solvent vapors. The adhesive is thus particularly suitable for indoor bonding involving large areas, especially since its open time can easily be varied and is generally up to 40 minutes and more particularly up to 30 minutes.

4. Processing does not involve the use of special equipment, such as for example the hotmelt guns used to apply hotmelts. Accordingly, the present invention also relates to the application of the adhesive according to the invention from a cartridge. It may then readily be spread over the substrate, for example with a spatula.

5. The adhesive has a shelf life of more than 18 months on the basis of the unchanged ISO 9048 extrusion rate after storage for 6 months at 50° C.

The invention is illustrated by the following Examples.

I. Production of the Assembly Adhesive

An assembly adhesive was produced as described above from the following components (in % by weight):

| | | |
|---|---|---|
| 1. | Styrene/acrylate copolymer latex, solids content ca. 50% by weight (Ucar-Latex-DL-345, Union Carbide) | 64.75 |
| 2. | Hydrophilic highly disperse silica (Kieselsäure-HDK-T-30, Wacker) | 2.0 |
| 3. | Acrylic acid/acrylamide copolymer aqueous solution emulsified in aliphatic petroleum fraction (Collacral-HP, BASF) | 2.0 |
| 4. | Marble, metamorphous (Omyacarb-5-GU, Omya) | 29.9 |
| 5. | Dispersion aid polyacrylic acid ammonium salt (Pigmentverteiler A, BASF) | 1.0 |
| 6. | Silver chloride/titanium dioxide preparation in water/EtOH/anionic surfactants (JMAC-LP 1%, Johnson Matthey) | 0.05 |
| 7. | Water | |

It is characterized by the following properties:

a) Early adhesion is between 28 $g/cm^{-2}$ and 30 $g/cm^{-2}$.

-continued b) The adhesive can be expressed from a cartridge with a standard cartridge gun (for example Klapp Pistole DW 111 [Henkel] or DW 100 cartridge gun [Henkel]).
c) Extrusion rate: 3,200 to 5,000 g/min as measured to DIN ISO 9048 (pressure: 2 bar, temperature 23 ± 2° C., 50 ± 5% rel. air humidity, extrusion unit with an internal diameter of 5.0 cm, a length of 18 cm and a nozzle diameter of 4 mm).
d) Open time: 15 to 25 mins.
e) Density (Erichsen): 1.3 g/cm³.

II. Adhesive Properties

The adhesive properties of the adhesive according to the invention were determined by the following tests.

1. Method for Determining Early Adhesion

A marking line is applied to a 15×3 cm long test specimen of untreated wood (beech plywood) with an 8 mm large hole in one side. The marking line is 10 cm from the 3 cm long side which does not have a hole.

A ca. 2 cm wide and 2 mm thick adhesive film is applied to the marked area of 10×3 cm. Small balls 2 mm in diameter are then pressed into the middle of the adhesive strip to guarantee the exact thickness of the adhesive film. The space between the balls is ca. 2 cm. The balls are situated on an imaginary straight line in the middle of the applied strip of adhesive.

After the balls have been introduced into the adhesive layer, a 15×1.5 cm aluminium rail (anodized aluminium) is pressed onto the balls. The aluminium rail used has an 8 mm diameter hole on side. The rail is placed on the adhesive layer in such a way that the hole does not lie in the adhesive layer and the terminal edge of the rail is level with the marking line drawn in as described above.

For the measurement, the test specimen is suspended from a spring balance, the hook of the spring balance being engaged in the hole of the strip of wood. The aluminium rail is then pulled slowly and uniformly perpendicularly of the wooden strip until the rail begins to slide off the adhesive layer. The value at which the rail begins to slide is read off from the spring balance. The measured value represents the early adhesion for an area of 15 cm². If the value obtained is divided by 15, an adhesion value in g/cm² is obtained.

2. Results

An adhesion value of 30 g/cm² was obtained. This is sufficient for immediately fixing a 11×21 cm building brick weighing 3.4 kg to a vertical wall for a layer thickness of up to ca. 5 mm.

We claim:

1. An aqueous polymer dispersion adhesive which comprises:
    A) 10 to 98% by weight of at least one aqueous dispersion of a (co)polymer comprising residues of at least styrene and optionally at least one member selected from the group consisting of alkyl acrylate and alkyl methacrylate containing 1 to 12 carbon atoms in the alkyl group, the solids content of the dispersion being in the range from 30 to 80% by weight;
    B) a thickener comprising a combination of a) 0.4 to 6% by weight, based on the weight of the adhesive, of an inorganic thickener, and b) 1 to 10% by weight, based on the weight of the adhesive, of an aqueous system comprising a polymer comprising residues of at least acrylic acid and acrylamide with a solids content of 10 to 40% by weight, wherein up to 90% by weight of the aqueous system being replaceable by at least one polymer dispersion selected from the group consisting of polymer dispersions containing acrylate residues, copolymer dispersions containing at least acrylic acid residues and methacrylic acid residues and polyurethanes the aqueous system having a solids content of 20 to 40% by weight;
    C) 0 to 88% by weight of fillers;
    D) 0to 2% by weight of pigments;
    E) 0 to 3% by weight of auxiliaries;
    F) 0 to 40% by weight of plasticizers; and
    G) water.

2. The adhesive as claimed in claim 1 comprising:
    A) 51 to 98% by weight of the styrene/acrylate (co)polymer dispersion;
    B) a) 1 to 3% by weight of highly disperse silica, c) 1 to 5% by weight of an acrylic acid/acrylamide copolymer w/o emulsion.

3. The adhesive as claimed in claim 1, having a pH value greater than 7.

4. The process for the production of the adhesive of claim 2 which comprises: forming a mixture of A) with the inorganic thickener and any of C) through G) to be included in the composition, and as a final step admixing the aqueous system of the copolymer comprising at least acrylic acid and acrylamide residues with the mixture.

5. The method of applying the adhesive of claim 2 wherein the adhesive is applied from a cartridge.

6. The method of claim 5 wherein the adhesive is applied to the substrate in a layer thickness of up to 30 mm.

7. The adhesive of claim 1 having a pH value in a range of 7–10.

8. The adhesive of claim 2 having a pH value of greater than 7.

9. The adhesive of claim 2 having a pH value in a range of 7–10.

10. The process for the production of the adhesive of claim 8 which comprises: forming a mixture of A) with the inorganic thickener and any of C) through G) to be included in the composition, and as a final step admixing the aqueous system of the copolymer comprising at least acrylic acid and acrylamide residues with the mixture.

11. The method for applying the adhesive of claim 2 wherein the adhesive is applied from a cartridge.

12. The method for applying the adhesive of claim 3 wherein the adhesive is applied from a cartridge.

13. The method of claim 11 wherein the adhesive is applied to the substrate in a layer thickness of up to 30 mm.

14. The method of claim 12 wherein the adhesive is applied to the substrate in a layer thickness of up to 30 mm.

15. The adhesive of claim 1 wherein the (co)polymer of styrene contains 30% to 100% by weight of styrene residues.

16. The adhesive of claim 2 wherein the (co)polymer of styrene contain from 30% to 100% by weight of styrene residues.

17. The adhesive of claim 3 wherein the (co)polymer of styrene contains from 30% to 100% by weight of styrene residues.

* * * * *